Figure 1:
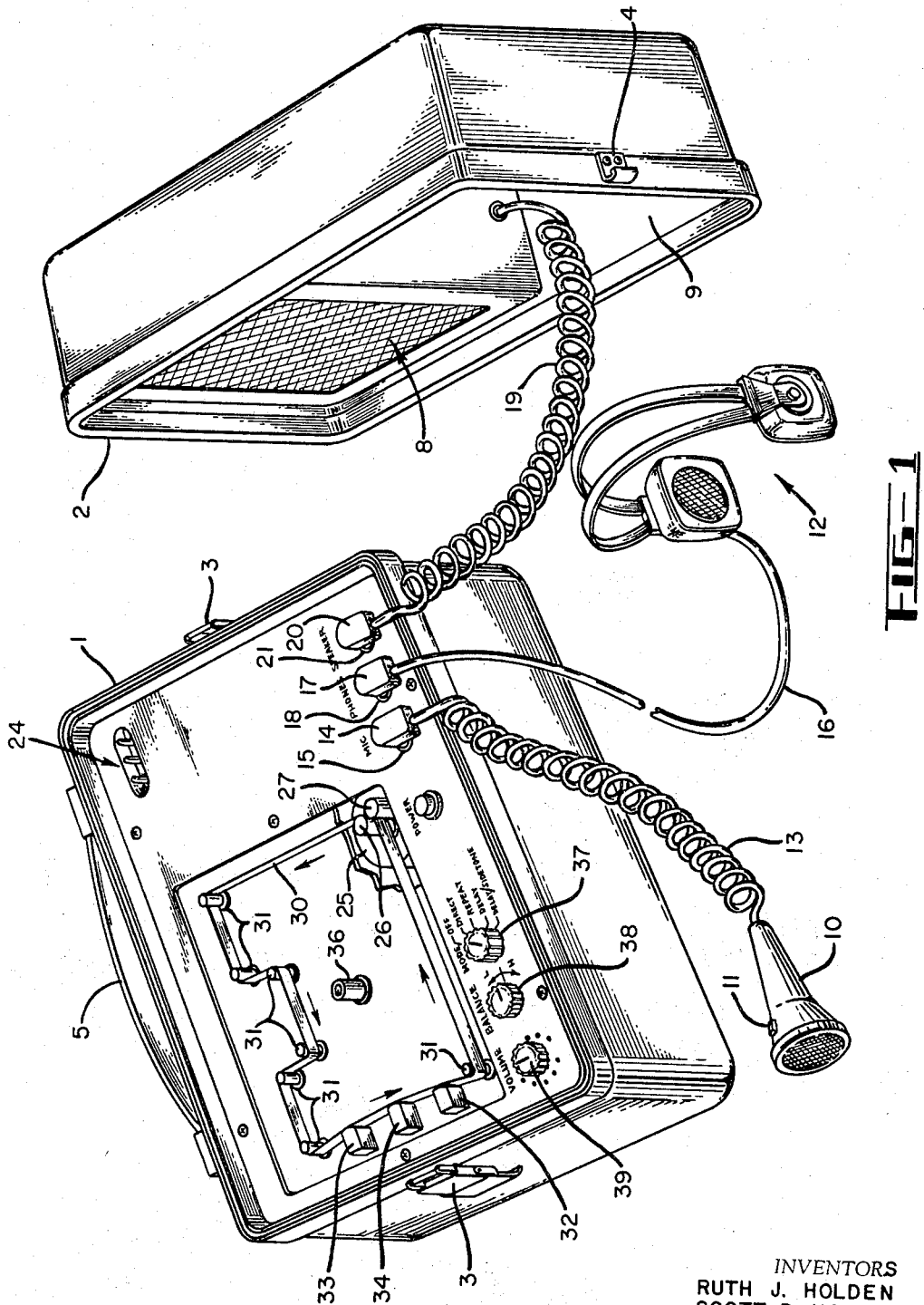

March 19, 1968

R. J. HOLDEN ET AL 3,373,508

TEACHING APPARATUS

Filed Oct. 29, 1964

2 Sheets-Sheet 1

FIG—1

INVENTORS
RUTH J. HOLDEN
SCOTT D. HOLDEN

BY *Leon F. Herbert*

ATTORNEY

3,373,508
TEACHING APPARATUS

Ruth J. Holden and Scott D. Holden, Palo Alto, Calif., assignors to HC Electronics, Inc., Palo Alto, Calif., a corporation of California
Filed Oct. 29, 1964, Ser. No. 407,448
12 Claims. (Cl. 35—35)

This invention relates to teaching apparatus and more particularly to apparatus related to the teaching of the sounds of spoken letters and words.

Once the ability to pronounce letters and words has been mastered it seems to be almost an inherent instinctive ability. However, the fact of the matter is quite the contrary, and the ability to speak properly is very much a matter of learning. The way in which one learns to speak is by listening, first to the teacher and then to ones attempt to imitate. In other words a student cannot learn normal speech if he is unable to hear the sound he is to learn and unable to hear his attempts to imitate. Unfortunately, some individuals are hampered in the ability to learn to speak properly, and some cases seem almost hopeless.

Accordingly, it is an object of this invention to provide teaching apparatus which will aid in instructing persons to speak properly, particularly those with speech problems. For example, the teaching apparatus of this invention has been found very beneficial in cases of delayed speech, hard of hearing, cerebral palsy, stuttering, cleft palate, and for the general improvement of articulation and voice.

It has of course been realized in the past that it is helpful to a student if his voice can be recorded and then played back so he can hear it the way it sounds to others. However, such apparatus has in the past been quite complicated. In some cases the prior apparatus has required the student to wait for a certain signal before he speaks. In other cases one or more switches must be operated, and sometimes substantial delay is involved, to obtain playback after the students voice is recorded. A number of devices are complicated by the requirement that a multi-track tape be used. Some prior devices require that the apparatus be reset between one record-playback sequence and the next, and even when the prior apparatus is capable of several record-playback sequences in succession it is eventually necessary in some cases to reset the apparatus, as by rewinding a tape. All of these activities distract from the impact of the teaching session. Accordingly, a further object of this invention is to provide simplified teaching apparatus which will not include any of the stated distracting aspects.

More specifically an object of the invention is to provide teaching apparatus which will permit a student to speak whenever he is ready and then after a few seconds delay hear his statement played back automatically without having to turn any switches, or take any other action, and arranged so that after the statement is made and played back the apparatus is automatically prepared for repeat operations indefinitely without any rewinding or other resetting. Operation of the apparatus in this manner will be hereinafter called "Delay" operation.

In addition to having the student hear his statement played back, it is also helpful in many cases to have the student hear his statement simultaneously with the recording thereof. The hearing discussed in this connection is not the hearing which is always present internally through the speaker's head, but rather hearing produced through a speaker or headphones simultaneously with recording. This type of hearing will be hereinafter referred to as "sidetone."

Another object of this invention is to provide teaching apparatus which will permit a student to speak and hear his statement simultaneously over a speaker or headphones and then after a few seconds delay hear his statement again over the speaker or headphones. Operation of the apparatus in this manner will be hereinafter called "Delay with Sidetone."

Another beneficial type of instruction is for the student to be able to listen repetitiously to sounds or words with which he is having particular difficulty. Thus, the student can benefit from hearing an instructor's correct pronunciation repeated over and over, preferably with a sufficient delay interval to afford the student an opportunity to attempt to copy the master's pronunciation between each repetition. Similarly, the student can benefit from hearing his own pronunciation repeated over and over so that he can have an opportunity to study it, preferably with a sufficient delay between repetitions so the student can experiment with improving his pronunciation.

Accordingly, a further object of the invention is to provide teaching apparatus with which the instructor or student can record his voice and then play it back so that it will be continuously and automatically repeated. Operation of the apparatus in this manner will be hereinafter called "Repeat."

An additional object of the invention is to provide a single teaching device which is selectively capable of the separate operations of Delay, Delay with Sidetone, and Repeat.

Another object of the invention is to provide a single teaching device which is selectively capable of the separate operations of Delay, Delay with Sidetone, Repeat, and the further operation wherein the student's or instructor's voice goes directly to a speaker or headphones without being recorded. This latter mode of operation will be hereinafter called "Direct."

A related object of the invention is to provide teaching apparatus of the type described wherein the sound to the speaker or headphones can be adjustably amplified whenever such sound is coming from the recording, but the sound coming from the microphone can only be adjustably amplified when the apparatus is in the Direct position.

Another object of the invention is to provide teaching apparatus of the type described wherein in the Repeat mode of operation the microphone is connected to the speaker or headphones but is disconnected from the recording means.

By way of brief description a teaching apparatus according to the invention comprises a closed loop recording tape and means for driving said tape along a continuous path. The apparatus includes recording means incorporating a recording head positioned along the line of travel of the tape for recording sounds on said tape. There are playback means for reproducing the sounds recorded on said tape and including a playback head spaced from said recording head in the direction of travel of the tape. Means for erasing the sounds on said tape include an erasing head positioned along the tape as it travels from the playback head to the recording head. The apparatus further includes a signal input line from a microphone and a signal output line to a speaker and headphones. The various components of the apparatus are so interrelated by switch means that the apparatus can be selectively operated in any one of the desired modes of operation previously described as Direct, Repeat, Delay, and Delay with Sidetone.

Figure 2:
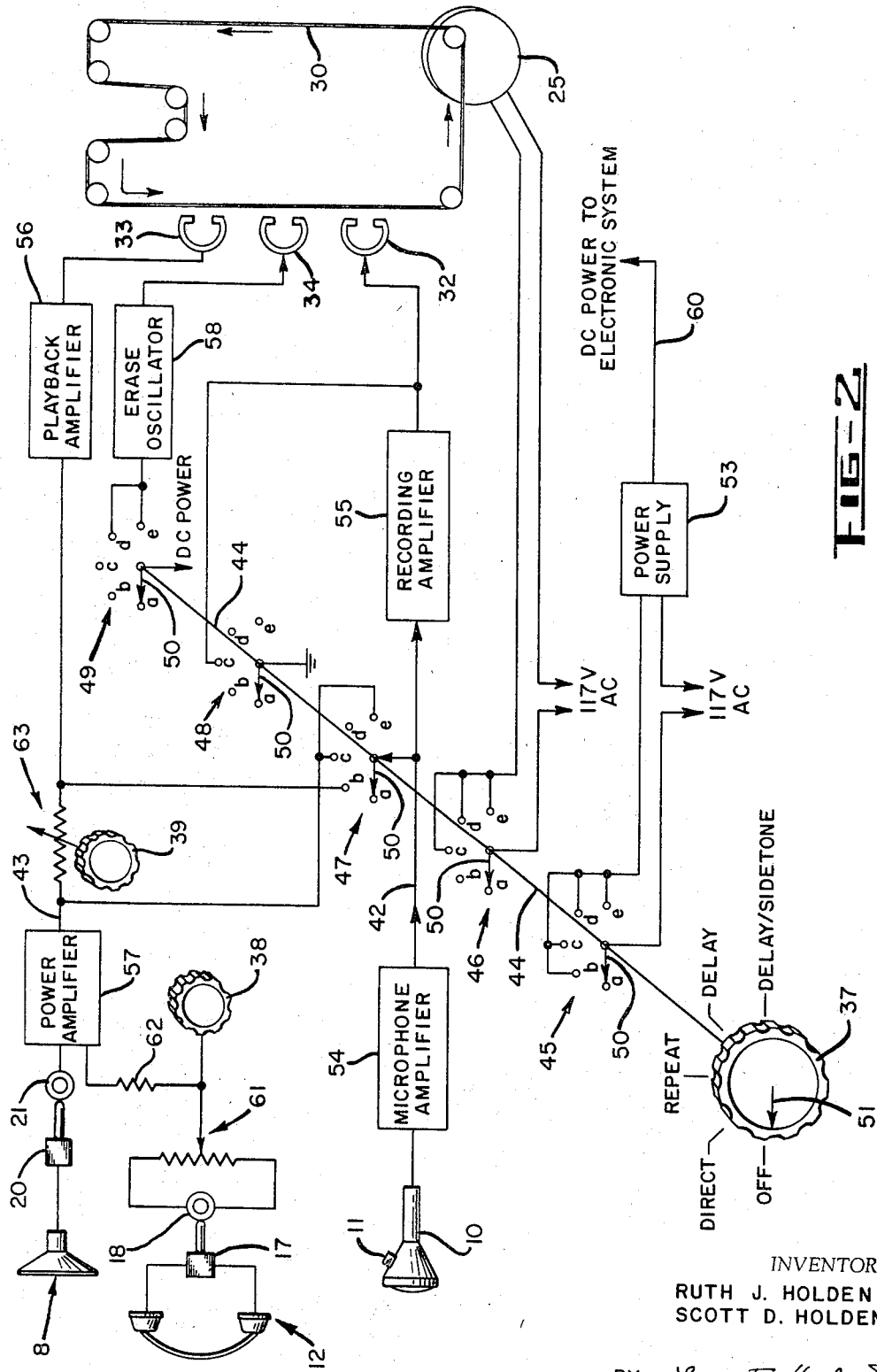

The various objects and features of advantage of the invention will be more apparent from the following detailed description wherein reference is made to the accompanying drawings in which:

FIGURE 1 is a perspective view of a preferred embodiment of the invention showing the various parts assembled for operation; and FIGURE 2 is a functional block diagram showing the operation of the apparatus of FIG. 1.

Referring in more detail to the drawings, FIG. 1 discloses a teaching apparatus comprising two casing sections, 1 and 2. Each of the casing sections is shaped as half of a carrying case. The two sections are adapted to be separated for use as shown in FIG. 1 or held together for transportation by means of conventional luggage clasps having portions 3 on casing section 1 and portions 4 on casing section 2. When the sections 1 and 2 are connected together they are easily transported as a unit by means of a handle 5 attached to the casing section 1. The casing section 2 incorporates a conventional speaker 8 and a storage space 9.

The apparatus includes a conventional microphone 10 having the usual press-to-speak button 11. In addition the apparatus includes a head phone set 12. The microphone 10 is connected by a cord 13 to a jack 14 which is receivable in a conventional jack fitting 15. The head phones are connected by a cord 16 to a conventional jack 17 which is receivable in a conventional fitting 18. Similarly, the speaker 8 is connected by a coil cord 19 to a jack 20 which is receivable in a fitting 21. A conventional three conductor cord (not shown) can be connected to the conventional fitting 24 to supply current to the apparatus from the usual 117-volt alternating current wall outlet.

The casing section 1 houses the electrical system as shown diagrammatically in the block diagram of FIG. 2. In addition, as shown in both FIGS. 1 and 2, casing section 1 houses a conventional motor 25 having a tape drive wheel 26 and a spring pressed idler wheel 27. A closed loop tape 30 is pressed between wheels 26 and 27 and driven along a closed path in a direction shown by the arrows. The tape 30 is made of conventional magnetic tape material. The travel of the tape is guided by posts 31. As shown both in FIGS. 1 and 2, the tape 30 is driven past a recording head 32, a playback head 33 and an erase head 34.

When all of the heads are operative and the tape is in motion, a spoken signal is first recorded by the recording head 32 and travels with the tape to the playback head 33 where it is played back. Then the recorded sounds are erased as the tape passes the erase head 34 on its way to the recording head 32 to receive a new recording. Preferably the well in which the tape is received is provided with a cover plate which has been removed to show the inside structure. The cover plate is held in place by a conventional quick release fitting having one part on the cover and a cooperating part 36 on the casing section 1.

Casing section 1 also includes a master control knob 37 which, as shown in the drawings, has five settings corresponding to an Off position and the four operational modes of Direct, Repeat, Delay, and Delay with Sidetone. A control knob 38 provides a balance control for the earphones. A volume control is provided by a knob 39.

Referring in more detail to FIG. 2 it will be seen that the apparatus comprises a signal input line 42 and a signal output line 43. The master control knob 37 is connected by a link 44 to a plurality of switches to cause simultaneous operation of said control knob and switches. The various switches are indicated in FIG. 2 by the reference numbers 45, 46, 47, 48 and 49. Each of the switches comprises a movable contact arm 50 and five stationary terminals designated a, b, c, d and e. The movable arms 50 correspond in position and movement to a pointer 51 on the master control knob 37. The stationary terminals a, b, c, d and e correspond, respectively, in position and function with the Off condition and the operational modes of Direct, Repeat, Delay, and Delay with Sidetone.

In addition to the previously mentioned elements the electronic system includes a conventional power supply 53 for converting 117 volt. A.C. current to the D.C. power required for the electronic system. Power from the power supply 53 operates a conventional microphone amplifier 54, a recording amplifier 55, a playback amplifier 56, a power amplifier 57 and an erase oscillator 58. The power supply 53 is connected directly to the elements 54–57 by conventional circuitry which has been signified schematically by the arrowhead line 60 from power supply 53. The power line 60 is connected to the erase oscillator through the switch 49. The balance control knob 38 is connected to the movable arm of a balance resistor unit 61, which is in turn connected to the power amplifier through a resistor 62. The volume control knob 39 is connected to the movable arm of an adjustable resistor unit 63.

The movable contact arm 50 of each of the switches is connected to a specific part of the electronic system so that as the movable arms are moved to the various stationary terminals a–e, the various parts of the system can be selectively interconnected or disconnected. More specifically the movable arm 50 of the switch 45 is connected to one side of the alternating current power source, the other side of which is connected to the conventional internal power supply 53. The stationary terminals b–e are all connected to the power supply 53 to complete the circuit thereto whenever the arm 50 contacts any of these terminals.

The movable contact arm 50 of switch 46 is connected to one side of the alternating current power source, the other side of which is connected to motor 25. The stationary terminals c, d and e are also connected to the motor to complete the circuit thereto whenever arm 50 engages any of these terminals.

The movable arm 50 of switch 47 is connected to the input line 42. The stationary terminals b, c and e are all connected to the output line 43 so that there is a direct connection between the input and output lines whenever the arm 50 engages the stationary terminals b, c and e. It will be noted that terminals c and e are connected to the output line beyond the volume control unit 63 so as not to be subject to volume control. The stationary terminal b is connected to the output line 43 in advance of the volume control 63 so that control 63 will adjust the volume of the signal coming from the stationary terminal b.

The adjustable contact arm 50 of switch 48 is connected to ground. The stationary terminal c is connected to the output side of the recording amplifier 55 so that when the arm 50 contacts terminal c, the recording amplifier is disabled and there is absolutely no possibility of any signal being accidently recorded.

The adjustable contact arm 50 of switch 49 is connected to the D.C. power from power supply 53. The stationary terminals d and e are both connected to the erase oscillator so that when arm 50 contacts terminals d and e the erase oscillator 58 will be energized to cause head 34 to erase any signal on the tape passing the head.

*Operation*

When the master control knob 37 is in the Off position as shown in the drawings, switch 45 will be in the off position with arm 50 engaging terminal a so that the power supply 53 is not energized. Thus, there will be no power reaching the electronic system. Similarly switch 46 will be in the off position with arm 50 contacting terminal a so that no power reaches motor 25. It should be understood that if desired switch 45 could be dispensed with, and instead the power supply 53 could be arranged in direct connection with the alternating current power source whenever a supply cord is connected between fitting 24 and a conventional wall socket. The result of such an alternative arrangement would of course be that elements 54–57 would be on whenever the apparatus is plugged in.

When the control knob 37 is turned clockwise to the Direct position, arm 50 of switch 45 engages terminal b to place the power supply on. The arm 50 of switch 46 engages terminal b to retain the motor 25 in off condition. Arm 50 of switch 47 engages terminal b to provide a direct connection between the input line 42 and the output line 43 in advance of the volume control 63. The movable arm 50 of switch 48 engages terminal *b* which has no effect on the recording amplifier 55. The arm 50 of switch 49 engages terminal *b* to retain the erase oscillator in off condition. Thus, when the apparatus is in the Direct mode of operation whatever is spoken into the microphone 10 when button 11 is depressed will pass through amplifier 54 and directly to the output line 43 in advance of the volume control 63 and thence through the power amplifier 57 to one or both of the speaker 8 and headphone 12. The signal does not pass through the recording head 32, tape 30 and playback head 33 because the motor 25 is off and therefore the tape 30 is stationary. The apparatus can be beneficially used in the Direct mode of operation as an auditory trainer to amplify speech sounds and thus intensify the auditory stimulus. In particular, the Direct mode can be used to aid in isolating sounds from a whole-word configuration. Another example of use in the Direct mode is to aid in identifying and comparing the characteristics of the correct sound and the characteristics of the incorrect sound.

When the control knob 37 is turned to the Repeat position the movable arm 50 of switch 45 is moved into contact with terminal *c* to keep the power supply 53 in on condition. The movable arm 50 of switch 46 is moved into contact with terminal *c* to place the motor 25 in on condition. The movable arm 50 of switch 47 is moved into contact with terminal *c* to connect the input line 42 with the output line 43. In this way whatever is spoken into the microphone 10 will be transmitted over the speaker and headphones, preferably at about a two-to-one amplification. The actual resulting amplification can of course be reduced by holding the microphone away from the mouth. The control arm 50 of switch 48 will be moved to contact the terminal *c* which will disable the recording amplifier as previously described. The movable arm 50 of switch 49 will engage terminal *c* to retain the erase oscillator in the off condition. Thus, when the control knob 37 is turned so that indicator 51 is in the Repeat position the motor 25 will be on, and the tape will be driven past the operating playback means comprising the playback head 33 and the playback amplifier 56. However the recording means 32 and 55 are inoperative and the erase means 34 and 58 are also inoperative. As a result any message previously recorded on the tape will be played back with continuous repetition everytime it passes the playback head 33. The previously recorded message is preferably placed on the tape when the apparatus is in the Delay position as will be hereinafter described in more detail. However, at this stage it should be noted that the wording which is placed on the tape for use in the Repeat position can be wording placed there by either the instructor or the student. In addition, it should be noted that the volume control arrangement is such that when the apparatus is in the Repeat position, with the desired wording on the tape, the volume control can be turned all the way down and the teacher can then give instructions through the microphone and over the speaker to tell the student what he is to do when he hears the wording which will be repeated. After the instructions are given, the knob 39 is simply turned to increase the volume of the playback signal so that the student can hear the recorded wording being repeated over and over.

The apparatus can be used beneficially in the Repeat position in the following ways. For example, the Repeat mode can be used by placing a correct model on the tape and having the student practice saying the model. Another helpful use is to catch a good sound of the students on the Repeat tape atnd have him copy it silently to get the tactile and kinestheic feedback to fix the correct tongue placement. In cases of stuttering it has been found very helpful to have the student "shadow" his speech; that is, have the student repeat aloud his wording on the tape immediately during each time the wording is played back in the Repeat position. In general the Repeat mode helps reinforce the auditory signal by having the student hear something many times, and of course the beneficial aspects recited for the Direct position apply also to the Repeat position.

When the control knob 37 is turned to the Delay position the movable arm 50 of switch 45 contacts the stationary terminal *d* to retain the power supply 53 in the on condition. The movable arm 50 of switch 46 contacts the stationary terminal *d* to retain the motor 25 in the on condition. The movable arm 50 of switch 47 contacts the terminal *d* to disconnect the direct connection between the input line 42 and the output line 43. The movable arm 50 of switch 48 contacts terminal *d* to render the recording amplifier operative. Arm 50 of switch 49 contacts treminal *d* to place the erase oscillator 58 in the on condition. Thus, when the apparatus is in the Delay position the motor 25 is operating to drive the tape 30. The recording means 55 and 32 are in their operative condition. The erase means 34 and 58 are in their operative condition, and the playback means 33 and 56 are in their operative condition. As a result anything spoken into the microphone 10 with button 11 depressed will be recorded on the tape 30. The tape is preferably made of a length and driven at a speed such that there is about a four second delay for the tape to travel from the recording head to the playback head. Thus, anything spoken into the microphone will be recorded and then after a four second delay will be played back over the speaker and headphones. After the wording is played back it passes the erase head 34 and is erased, automatically preparing the tape for a new recording. The way in which a pre-recording is made for use in the Repeat position it is simply to speak the desired words into the microphone with the apparatus in the Delay position and then switch the knob 37 to the Repeat position before the recorded words reach the erase head 34. The apparatus can be beneficially used in a variety of ways when it is in the Delay mode of operation. For example, the instructor can place model wording on the tape and have the student attempt to repeat the model immediately before playback. This enables the student to immediately hear the difference between the model sound and his own sound. The Delay mode is particularly helpful in a self-monitoring function wherein the student says something, hears it played back and then trys to say it better, with the entire sequence being repeated many times. In addition, the various beneficial aspects described for the Direct position are in general applicable in the Delay position.

When the master control knob 37 is turned to the Delay with Sidetone position, the adjustable contact 50 of switch 45 engages terminal *e* to retain the power supply 53 in on condition. Similarly the arm 50 of switch 46 engages the terminal *e* to retain the motor 25 in on condition. The arm 50 of switch 47 engages terminal *e* to place the input line 42 in direct connection with the output line 43 beyond the volume control 63. The arm 50 of switch 48 contacts terminal *e* to retain the recording means in their operative condition. Similarly the arm 50 of switch 49 engages contact *e* to retain the erase means in their operative condition. It will now be apparent that the only difference between the Delay position and the Delay with Sidetone position is that in the former the switch 47 disconnects the direct connection between line 42 and line 43, whereas in the latter line 42 is directly connected to line 43. The apparatus can be beneficially used in the Delay with Sidetone mode of operation in substantially the same ways as in the Delay position, but including the sidetone feature which is not present in the pure Delay position. One special use of the Delay with Sidetone mode is a technique which is particularly beneficial in connection with teaching reading. More specifically, with knob 37 in the Delay with Sidetone position the student reads aloud into the microphone and gains the benefit of hearing himself over the speaker and headphones. The volume is turned down so the student is not distracted by hearing the playback. However, his speech is being recorded, and when the instructor hears a statement of the student which he would like to call to the student's attention, the instructor turns knob 37 to the Repeat position to retain the desired statement on the tape. The student is told he has made the statement of interest, and then the volume is turned up so the student can hear the statement being played back in the Repeat mode.

In general it will be understood by those skilled in the art of speech therapy that the apparatus described herein is extremely useful, in all of its various positions, for use in the procedure of correlating auditory and visual symbols, that is, showing a student a letter or word and having him hear it pronounced. This procedure is of course a very helpful tool in the teaching of reading. Similarly, the apparatus lends itself naturally to use with sandpaper letters and other techniques which combine kinesthetic and auditory stimuli. In addition, the apparatus is conveniently usable with both group and individual therapy.

Although specific details of the invention are described and shown herein, it is to be understood that modifications may be made therein without departing from the spirit and scope of the invention as set forth in the appended claims.

Having thus described the invention, what is claimed as new and desired to be secured by Letters Patent is:

1. Teaching apparatus of the type which comprises an endless recording medium of predetermined length sensitive throughout its entire length, recording means cooperating with said medium for recording sounds thereon, a microphone having means for selectively connecting its output to the recording means to selectively record sounds applied to the microphone on said recording medium, playback means cooperating with said recording medium for reproducing sounds recorded thereon, erasing means between said playback and recording means for erasing the sounds recorded on said medium, means for continuously driving the recording medium past said recording means, playback means, and erase means; means mounting said playback means at a position spaced from said recording means a distance along the direction of travel of said medium equal to a major portion of the length thereof, and means for simultaneously energizing said recording means, playback means, erasing means and drive means whereby sound is recorded, and played back only after the recording medium has travelled over a major portion of its length, and then erased.

2. Teaching apparatus of the type which comprises an endless recording medium of predetermined length sensitive throughout its entire length, recording means cooperating with said medium for recording sounds thereon, a microphone having means for selectively connecting its output to the recording means to selectively record sounds applied to the microphone on said recording medium, playback means cooperating with said recording medium for reproducing sounds therefrom, erasing means for erasing the sounds recorded on said medium, means for continuously driving the recording medium past the recording means, playback means and erase means, means mounting said erase and recording means closely adjacent each other and said playback means and being arranged, in the direction of tape travel, in the order: playback means, erase means and recording means; and means for simultaneously energizing said recording means, playback means, erasing means and drive means whereby a sound is recorded and played back only after the recording medium has travelled over a major portion of its length, and then erased.

3. Teaching apparatus comprising means for driving a recording tape, recording means for recording sound on said tape, playback means for reproducing the sounds recorded on said tape and spaced from said recording means in the direction of travel of the tape, erasing means for erasing the sound on said tape as the tape travels from said playback means to said recording means, a signal input line to said apparatus, a signal output line, first switch means having an operative position in which said recording, playback and drive means are all on and another position in which at least one of said recording and playback and drive means is off, a second switch means having an operative position in which said input line is connected directly to said output line and another position in which said direct connection is disconnected, a single control for operating both said switches simultaneously, said control having one position in which said first and second switch means are simultaneously in an operative position, and said control having another position in which said first switch means is in an operative position and said second switch means is in a disconnect position.

4. Teaching apparatus as in claim 3 in which said control has a further position in which said first switch means is in off position and said second switch means is in operative position.

5. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, a signal input line to said apparatus, a signal output line, first switch means having an operative position in which said recording and playback and drive means are all on and another position in which at least one of said recording and playback and drive means is off, second switch means having an operative position in which said input line is connected directly to said output line and another position in which said direct connection is disconnected, and third switch means having an operative position in which said erasing means are on and another position in which said erasing means are off, a single control for simultaneously operating all of said switches, said control having one position in which said first and third switch means are in operative position and said second switch means is in the disconnect position.

6. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, a signal input line to said apparatus, a signal output line, first switch means having an operative position in which said recording and playback and drive means are all on and another position in which at least one of said recording and playback and drive means is off, second switch means having an operative position in which said input line is connected directly to said output line and another position in which said direct connection is disconnected, and third switch means having an operative position in which said erasing means are on and another position in which said erasing means are off, a single control for operating all of said switch means simultaneously, said control means having one position in which said first and third switch means are in an off position and said second switch means is in an operative position.

7. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, a signal input line to said apparatus, a signal output line, first switch means having an operative position in which said recording and playback and drive means are all on and another position in which at least one of said recording and playback and drive means is off, second switch means having an operative position in which said input line is connected directly to said output line and another position in which said direct connection is disconnected, and third switch means having an operative position in which said erasing means are on and another position in which said erasing means are off, and a single control for operating all of said switches simultaneously, said control having one position in which said first and second and third switch means are all in operative position simultaneously, and said control having a second position in which said first and third switch means are in operative position and said second switch means is in disconnect position.

8. Teaching apparatus as in claim 7 in which said control has a further position in which said first and third switch means are in off position and said second switch means is in operative position.

9. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, a signal input line to said apparatus, a signal output line, one switch means having an operative position in which said playback and drive means are both on and another position in which at least one of said playback and driving means is off, second switch means having an operative position in which said input line is connected directly to said output line and another position in which said direct connection is disconnected, third switch means having an operative position in which said erasing means is on and another position in which said erasing means is off, fourth switch means having an operative position in which said recording means is on and another position in which said recording means is off, and a single control for operating all of said switch means simultaneously, said control having one position in which said one switch means and said second switch means are on and said third and fourth switch means are off.

10. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, one switch means having an operative position in which said driving and playback means are both on and another position in which at least one of said driving and playback means is off, another switch means having an operative position in which said erasing means is on and another position in which said erasing means is off, further switch means having an operative position in which said recording means is on and another position in which said recording means is off, and a single control for operating all of said switch means simultaneously, said control having one position in which said driving and playback means are on and said recording and erasing means are off.

11. Teaching apparatus as in claim 10 in which said single control has another position in which said playback and drive and erasing and recording means are all on.

12. Teaching apparatus comprising means for driving a continuous tape along a closed path, recording means for recording sounds on said tape, playback means for reproducing the sounds recorded on said tape and spaced from said recording means in the direction of travel of the tape, erasing means for erasing the sounds on said tape as the tape travels from said playback means to said recording means, a signal input line to said apparatus, a signal output line, one switch means having an operative position in which said playback and drive means are both on and another position in which at least one of said playback and driving means is off, a volume control connected between said playback means and said output line, second switch means having one operative position in which said input line is connected to said output line through said volume control and another operative position in which said input line is connected to said output line in bypassed relation to said volume control, said second switch means having an inoperative position in which said connections between the input and output lines are broken, third switch means having an operative position in which said erasing means is on and another position in which said erasing means is off, and fourth switch means having an operative position in which said recording means is on and another position in which said recording means is off.

References Cited

UNITED STATES PATENTS

| | | | |
|---|---|---|---|
| 2,876,561 | 3/1959 | Horne | 35—35.3 |
| 3,059,348 | 10/1962 | Mezzacappa | 35—35.3 |
| 3,155,778 | 11/1964 | Meyer | 35—35.3 |
| 3,156,052 | 11/1964 | Irazoqui | 35—35.3 |
| 3,200,516 | 8/1965 | Parker | 35—35.3 |

FOREIGN PATENTS 771,104  3/1957  Great Britain.

EUGENE R. CAPOZIO, *Primary Examiner.*

W. H. GRIEB, *Examiner.*